United States Patent
Van Cleve et al.

(10) Patent No.: US 6,386,048 B2
(45) Date of Patent: May 14, 2002

(54) BALANCE BAR FOR A CORIOLIS FLOWMETER

(75) Inventors: Craig Brainerd Van Cleve, Lyons; Gregory Treat Lanham, Longmont; Robert Barclay Garnett, Arvada; Curtis John Ollila, Westminster; Rachael Esther Cohen, Niwot, all of CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/916,793

(22) Filed: Jul. 27, 2001

Related U.S. Application Data

(62) Division of application No. 09/345,078, filed on Jun. 30, 1999.

(51) Int. Cl.[7] .................................................. G01F 1/66
(52) U.S. Cl. ................................ 73/861.357; 29/888.09
(58) Field of Search ...................... 73/861.354, 861.355, 73/861.357; 29/592.1, 888.09

(56) References Cited

U.S. PATENT DOCUMENTS

| | | |
|---|---|---|
| 4,760,744 A | 8/1988 | Simonsen et al. |
| 4,831,885 A | 5/1989 | Dahlin |
| 5,365,794 A | 11/1994 | Hussain et al. |
| 5,473,949 A | 12/1995 | Cage et al. |
| 5,691,485 A | 11/1997 | Endo et al. |
| 5,731,527 A | 3/1998 | Van Cleve |
| 5,979,246 A | 11/1999 | Van Cleve et al. |
| 5,996,225 A | * 12/1999 | Ollila et al. ............. 29/888.09 |
| 6,006,609 A | * 12/1999 | Drahm et al. .......... 73/861.355 |

FOREIGN PATENT DOCUMENTS

| | | |
|---|---|---|
| EP | 04099918 | 3/1992 |
| EP | 0759542 A1 | 2/1997 |

* cited by examiner

*Primary Examiner*—Max Noori
(74) *Attorney, Agent, or Firm*—Faegre & Benson LLP

(57) ABSTRACT

A balance bar for a straight tube Coriolis flowmeter. The balance bar is preferably manufactured by process that provides an increased number of flowmeter elements integral to the balance bar. These integral elements comprise: brace bars at each end of the balance bar, rib elements on each side of the balance bar to raise the horizontal vibration frequency, a surface to facilitate the mounting of a driver to the balance bar and to a flow tube surrounded by the balance bar, surfaces to facilitate the mounting of sensors to the balance bar and flow tube, voids that lower the resonant frequency of the balance bar in a drive plane, and a cavity that makes the vibration amplitude of the balance bar less than that of the flow tube. These elements lower the resonant frequency of the balance bar to make the flowmeter calibration factor independent of density. The balance bar is ideally made by a casting process. The balance bar may also be fabricated by other processes including machining.

11 Claims, 2 Drawing Sheets

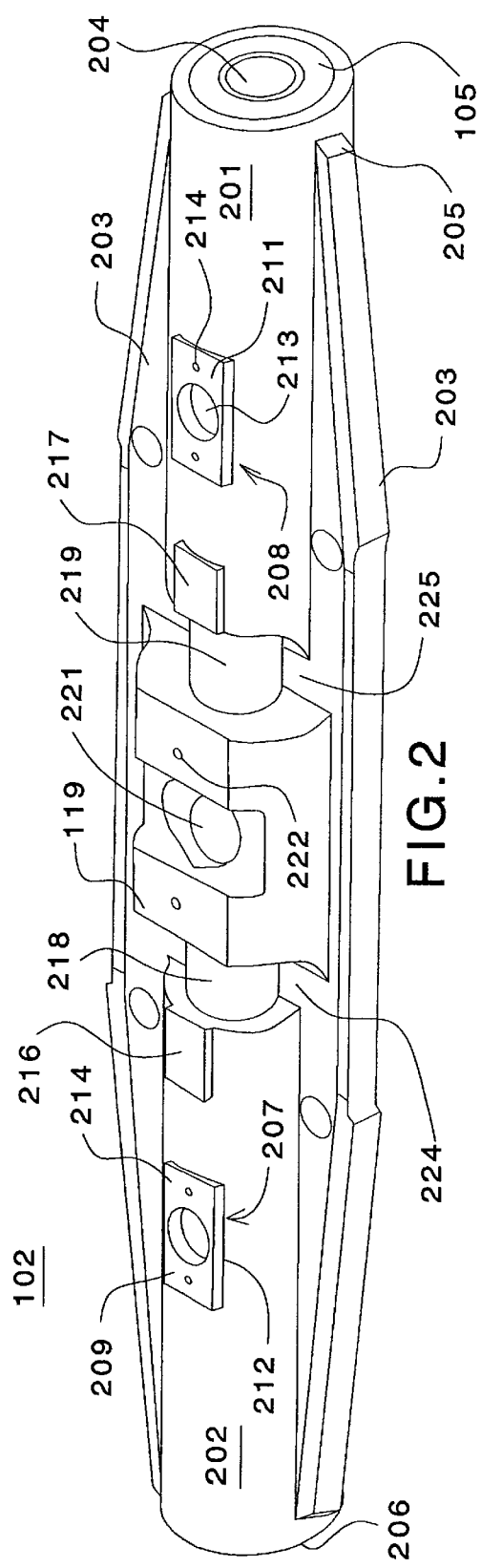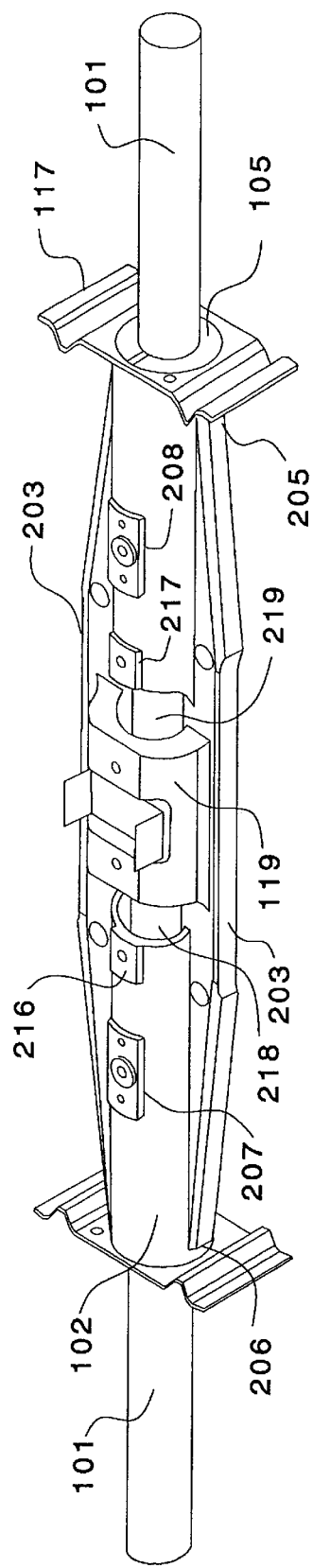

BALANCE BAR FOR A CORIOLIS FLOWMETER

CROSS REFERENCE TO A RELATED APPLICATION

This application is a divisional of U.S. patent application Ser. No. 09/345,078 titled "Balance Bar for a Coriolis Flowmeter" and filed on Jun. 30, 1999. The referenced application is hereby incorporated by reference as if the referenced application were included in this application.

Field of the Invention

This invention pertains to a Coriolis flowmeter and in particular to a balance bar for a Coriolis flowmeter. The present invention also pertains to a method of fabricating a balance bar of a single tube Coriolis flowmeter.

Problem

Coriolis flowmeters are characterized by a flow tube through which material flows while the flow tube is caused to vibrate at its resonant frequency. When material is not flowing, every point on the flow tube vibrates in phase with every other point on the flow tube. Two pick off devices (usually velocity sensors) positioned at different points on the flow tube generate sinusoidal signals that have the same phase when no material flows and that have a phase difference between them when material flows. This phase difference is caused by Coriolis forces generated by material flow through the vibrating flow tube. The magnitude of the phase difference between any two points along the length of the flow tube is proportional to the mass flow rate of the material flow. Coriolis mass flowmeters employ signal processing that determines this phase difference and produces an output signal indicating the mass flow rate along with other information pertaining to the material flow.

Coriolis flowmeters may have either a single flow tube and an associated balance bar or a plurality of flow tubes. It is important that the vibrating structure of a Coriolis flowmeter comprise a dynamically balanced system. In Coriolis flowmeters having a pair of flow tubes, the flow tubes are vibrated in phase opposition to form a dynamically balance system. In single flow tube flowmeters, the flow tube is vibrated in phase opposition with an associated balance bar to form a dynamically balanced system.

The vibrating system of a Coriolis flowmeter is operated at the resonant frequency of the vibrating elements including the material filled flow tube. This requirement is of no problem in dual flow tube meters since the two flow tubes are identical to each other, and they both contain the flowing material and therefore have the same resonant frequency. However, it is a problem for single tube flowmeters to meet this requirement. The flow tube and the surrounding balance bar are different structures with different physical and vibrational characteristics. The flow tube is a cylindrical element that has a relatively small diameter compared to the balance bar. In prior art meters, the balance bar is a larger concentric cylindrical tube. For cylinders of the same length, as the diameter increases, the stiffness increases at a faster rate than the mass. The balance bar (without added mass) therefore has a higher resonant frequency than that of the material filled flow tube. Since it is desirable that the balance bar and the material filled flow tube have the same resonant frequency, prior art flowmeters have used expedients such as the attachment of weights to the balance bar to lower its resonant frequency to that of the flow tube. Such arrangements are shown in U.S. Pat. Nos. 5,691,485 and 5,796,012. Although such prior art arrangements are effective to match the resonant frequency of the balance bar to that of the flow tube, the use of mechanical expedients, such as added weights, results in a cumbersome and expensive structure. Furthermore, if the density of the measured fluid is especially high or low, special weights are required to maintain a balanced structure.

Another problem with prior art single tube flowmeters is that their use of a cylindrical member for the balance bar results in the generation of undesired frequencies that are close to the frequency of the Coriolis deflections signals. The Coriolis signals have a frequency equal to the first bending mode (drive frequency) of the flowmeter. It is desirable for efficient signal processing that the Coriolis deflection signals be of a large amplitude and separated in frequency from the unwanted vibrations. This enables the signal processing circuitry to process the Coriolis deflection signals without interference from undesired signals. The use of cylindrical balance bar is a problem since a cylinder is a symmetrical structure having equal vibration frequencies in all planes of vibration. The cylindrical balance bar can have undesired lateral vibrations (perpendicular to the drive plane) that are equal in frequency to the Coriolis deflection signals.

It is a problem that prior art flowmeters use elements such as weights attached to the cylindrical balance bar. Weights can lower the resonant frequency of the balance bar but they do nothing to separate the desired and undesired vibration frequencies. The use of weights is costly and undesirable and limits the density range of the flowmeter.

It is a further problem in the prior art single tube flowmeters to mount the pick offs and a driver to a cylindrical balance bar. Pick offs and drivers comprise a magnet and coil combination with the magnet being mounted on the flow tube and the coil on the balance bar. The mounting of the coil structure to the balance bar requires special machining operations so that the coil hardware can be affixed to the balance bar. Flats are machined on the balance bar because of the difficulty in mounting to a cylindrical surface. Holes need to be drilled and tapped for mounting screws. A problem arises here in that after machining the flats there may not be sufficient wall thickness remaining for enough threads. Finally, a large hole needs to be machined into the center of the flat so that the magnet can protrude through the balance bar wall and into the coil center. This is a cumbersome time consuming and expensive process. Coils must then be made to fit on the surface of the cylindrical balance bar. As a result, each different flowmeter then requires different coils.

A further problem of prior art straight tube Coriolis flowmeters using a cylindrical balance bar is that a separate element, termed a brace bar, must be affixed to the balance bar ends. The brace bar is a ring like element having a plane perpendicular to the longitudinal axis of the balance bar. The outer circumference of each brace bar is affixed to the inner wall of the balance bar at each of its ends. Each brace bar has a center opening for receiving the flow tube which projects through the brace bars and terminates in end flanges. The brace bars are traditionally brazed or welded to the balance bar on their outer circumference and to the flow tube on their inner circumference. The brace bar provides a path that permits the brace bar and flow tube to be connected into a single vibrating structure. The integrity of the joints between the brace bars and the other components are critical. If any of the four brazed or welded joints are incomplete or otherwise flawed, the performance and the reliability of the meter is degraded. It is therefore a problem that there are four joints in a critical region.

It can therefore be seen from the above that the use of a cylindrical member as a balance bar in single tube Coriolis flowmeters creates problems in the lowering of the resonant frequency of the balance bar, reducing lateral vibrations of the balance bar, in the mounting of a driver and pick offs to the balance bar, and in the need for a separate brace bar to connect the balance bar ends with the flow tube.

Solution

The above and other problems are solved and an advance in the art is achieved by the present invention which comprises a method of fabrication and apparatus for the provision of a balance bar that overcomes the above problems of prior art cylindrical balance bars. The balance bar of the present invention comprises a hollow elongated element having an axial center section, voids on each side of the center section and cylindrical elements on each end. The balance bar also includes integral side ribs extending the length of the balance bar. The balance bar is advantageously manufactured by a casting process that provides flat surfaces with holes for accommodating the mounting of a driver and pick off elements.

The provision of a void on each side of the center section lowers the stiffness of the balance bar to vibrations in the drive plane. This lowers the resonant frequency of the balance bar so that it is equal to the resonant frequency of the material filled flow tube. This method of lowering the resonant frequency of the balance bar is an improvement over the use of weights in prior art flowmeters. Weights lower vibration frequencies in all directions equally. Voids, however can be located so as to selectively lower the vibration frequencies in one plane. In the present invention, the voids are located in areas of the balance bar that experience the maximum bending stress in the drive mode. This leaves balance bar material in the proximity of the neutral axis. Vibration frequencies in the lateral direction, however, are not significantly lowered. For lateral vibration the voids remove material from the region of the neutral axis and leave the material in the region of the highest bending stress.

The voids have another benefit. The removal of stiffness in the drive mode from the central region of the balance bar leaves most of the remaining drive mode stiffness at the ends of the balance bar and in the brace bars. This location of the stiffness facilitates the maintaining of meter balance over a wide range of fluid densities. In a balanced meter the flow tube, the balance bar, and the brace bar constitute the dynamic system. The flow tube vibrates out of phase with the balance bar. Parts of the brace bar vibrate with the flow tube and other parts vibrate with the balance bar. Separating the two groups in each brace bar is a nodal surface which does not vibrate.

When the fluid density increases, the nodal surface moves inward toward the flow tube. In moving, the nodal surface transfers a region of the brace bar from the flow tube side of the nodal surface to the balance bar side of the surface. This transfers the mass of the area from the (too heavy) flow tube to the (too light) balance bar and thereby helps to balance the meter. The transferred mass also has stiffness associated with it. However, because short springs are stiffer than long springs (everything else being equal), the stiffness is transferred in the other direction, from the balance bar to the flow tube. This also helps to balance the meter by raising the resonant frequency of the flow tube which had been decreased by the dense fluid. The stiffness transfer also lowers the balance bar resonant frequency making it closer to the flow tube frequency. If equality can be maintained between the resonant frequencies, the flow tube and balance bars will adjust their vibration amplitudes so as to remain balanced.

This transfer of mass and stiffness as fluid density changes would be an ideal method of maintaining meter balance over a wide range of fluid densities except it does not transfer nearly enough mass or stiffness in the prior art meters. The brace bar is small so the mass transferred by the shifting nodal surface is small. Furthermore, the stiffness of the balance bar in prior art meters is diffused throughout the entire balance bar cylinder so that the stiffness transfer is also small. The balance bar of the present invention, however, has the stiffness removed from the central region by the voids. This concentrates the stiffness in the ends of the balance bar and in the brace bars. Motion of the nodal surfaces therefore transfers more stiffness with fluid density changes. This results in better balance over a wider range of fluid density than prior art meters.

The voids in the balance bar of the present invention also lower the resonant frequency of the second bending vibration mode of the balance bar. This mode is shaped like the Coriolis deflection of the flow tube in that it has a node in the center of the balance bar with the deflection amplitude on either side of the node having opposite signs. The second bending mode of the balance bar can be excited by the Coriolis deflection of the flow tube. Because the second bending resonant frequency is higher than the frequency of the Coriolis deflection frequency (also the drive frequency), the balance bar moves in phase with the Coriolis deflections of the flow tube. This in phase motion reduces the apparent Coriolis deflection amplitude of the flow tube because the pickoffs measure relative motion between the flow tube and the balance bar. The smaller apparent Coriolis deflection signal out of the pickoff results in decreased sensitivity of the meter. However, the decrease in sensitivity due to the excitation of the balance bar second bending mode can be used to make the flow sensitivity of the meter independent of the fluid density.

Prior art Coriolis flowmeters have a flow sensitivity that decreases with fluid density. The electronics must compensate for this shift. The reason for the shift is that the pickoff signals' output is proportional to the relative velocity between the flow tube and the balance bar. The flow tube experiences Coriolis deflection with flow while the balance bar does not. Each pickoff output thus is the vector sum of the phase shifted tube velocity and the non phase shifted balance bar velocity. The net phase shift between the pickoffs is thus reduced by the non phase shifted balance bar. If the balance bar vibration amplitude is large compared to the flow tube vibration amplitude, then the net phase shift output is greatly reduced. If the balance bar vibration amplitude is small compared to the flow tube, then the reduction in net phase output is only slightly reduced.

The shift in flow sensitivity with fluid density is due to the fact that the amplitude ratio between the flow tube and the balance bar shifts with fluid density. With a high density fluid the flow tube amplitude is reduced compared to the balance bar and the flow sensitivity drops. With a low density fluid the flow tube amplitude is increased compared to the balance bar and the flow sensitivity rises.

The balance bar of the present invention overcomes this problem by way of the voids which lower the balance bar second bending mode frequency. As formerly stated, excitation of the balance bar second bending mode by the Coriolis deflection of the flow tube tends to decrease the sensitivity of the meter. The degree of excitation of the balance bar second bending mode is a function of the separation of the balance bar's second bending resonant frequency from the Coriolis (drive) frequency. If the two frequencies are close then the amplitude of the second bending is large and the reduction in flow sensitivity is great. If the frequency separation is large then the amplitude of the balance bar second bending is small and the reduction in flow sensitivity is small. The frequency of the balance bar second bending does not change with fluid density but the drive frequency does. Thus with a dense fluid the drive frequency drops, the frequency separation increases, and the reduction in sensitivity decreases. Likewise, with a low density fluid, the drive frequency increases, the frequency separation decreases, and the reduction in sensitivity increases. These shifts in flow sensitivity with fluid density are the opposite of the shifts in sensitivity with density due to the amplitude ratio shift. By properly spacing the balance bar second bending frequency from the drive frequency the sensitivity shift due to the changing amplitude ratio and the shift due to the changing balance bar second excitation can be made to cancel each other. This results in a meter with a flow sensitivity that is independent of fluid density.

The voids on either side of the center section of the balance bar are used to position the second bending frequency of the balance bar so as to have a meter with a flow sensitivity independent of fluid density. Larger voids tend to lower both the drive frequency and the balance bar second while moving the voids outward toward the pickoff locations tends to raise the drive frequency and lower the balance bar second bending frequency. By proper size and location of the voids, the frequency separation can be set at the correct value to yield a flow sensitivity that is independent of fluid density.

The balance bar of the present invention also has a center portion which permits the balance bar drive amplitude to be lower than the drive amplitude of the flow tube. As was stated earlier, the phase shift between pickoffs signals for a given flow rate is reduced by the non-phase shifted balance bar motion. By putting mass in the center section of the balance bar and stiffness in the end portions, the amplitude of the balance bar can be reduced while maintaining meter balance. Reducing the balance bar amplitude compared to the flow tube increases the phase shift out of the pickoffs and thus increases meter flow sensitivity. With a cast balance bar, mass and stiffness can be added to the balance bar in any amount and any location with little effort or added cost to reduce the balance bar amplitude.

A further advantage of the balance bar of the present invention is that the side ribs raise the frequencies of lateral vibrations while leaving the drive plane vibrations of the balance bar substantially unaffected. This minimizes the amplitude of undesired lateral vibrations while raising their frequencies. This control of vibration frequencies by the side ribs permits the desired Coriolis deflection signal to be applied to the associated meter electronics while the signals representing undesired frequencies are reduced in magnitude and with increased frequency separation from the Coriolis deflection signals. This facilitates the signal processing of the Coriolis deflection signals and enhances the accuracy of the Coriolis flowmeter output data.

The casting of the balance bar also permits the fabrication process to provide the holes and mounting surfaces for a driver and pick offs that are mounted on the balance bar when the flowmeter is assembled. This permits the pads for the mounting of the pickoffs to comprise material added to the brace bar rather than machined away. By adding pads the wall thickness of the balance bar is not locally reduced and thus there is enough material for tapping of the holes for the pickoff mounting fasteners.

A further advantage of the present invention is that the fabrication process includes the provision of brace bar integral with the balance bar ends. The integral brace bars have a center opening for receiving the flow tube which extends for the length of the flowmeter to a flange at each end. The integral brace bars eliminate the two critical braze joints that were formerly needed to connect the brace bars to the balance bar.

A further feature and advantage of the invention is that the side ribs of the present invention are integral with the balance bar so that they provide added cross section area to the balance bar in the region of the voids. The added cross section area reduces the high stresses in the balance due to compressive or tensile thermal forces applied to the balance bar by the flow tube or the case. The voids on each side of the center section of the balance bar, if applied to a prior art tubular balance bar, would result in a locally reduced cross sectional area which would weaken the prior art balance bar. Axial stress and axial forces applied to the prior art balance bar as a result of temperature differentials would result in unacceptably high stresses in the areas proximate the voids. However, the balance bar of the present invention has a cross section area in these regions increased by the side ribs and thus the thermally induced stresses are reduced to an acceptable level.

The fabrication by casting of the balance bar with all the aforementioned features eliminates the need for many of the machining, welding, or brazing operations that are required of the prior art cylindrical balance bars. The balance bar of the present invention achieves an advance in the art by overcoming the disadvantages of the heretofore available prior art straight tube Coriolis flowmeter.

An aspect of the invention is a Coriolis flowmeter having:
a flow tube for receiving a material flow;
a balance bar coupled by a brace bar means to said flow tube;
a driver that vibrates said flow tube and said balance bar in phase opposition at a drive frequency substantially equal to the resonant frequency of said flow tube with material flow;
said vibrations and said material flow are jointly effective for inducing Coriolis deflections of said flow tube;
pick off means coupled to said flow tube that generate signals representing information pertaining to said material flow in response to said said Coriolis deflections; said Coriolis flow meter further comprises:
at least one rib element integral to said balance bar that raises the resonant frequency of lateral vibrations of said balance bar.

Another aspect is that said at least one rib element comprises a pair of ribs positioned on sides of said balance bar and oriented parallel to the longitudinal axis of said balance bar.

Another aspect is that said balance bar includes voids;
said ribs increase the cross sectional area of said balance bar in a portion of said balance bar proximate said voids to increase axial stiffness of said balance bar and resist the tensile and compressive forces axially exerted on said balance bar whenever said flow tube attempts to change in length.

Another aspect is that said driver includes a drive magnet and a drive coil; said Coriolis flowmeter further comprises:

a hole in said balance bar for receiving said magnet; and a first mounting element integral to said balance bar that enables the attachment of said drive coil to said balance bar.

Another aspect is that said first mounting element that enables said attachment of said drive coil includes:

an axially center element on said balance bar; and a flat surface on said center element having a center opening that enables said drive magnet to protrude through said center opening into said drive coil.

Another aspect is that a second mounting element integral to said balance bar that enables the attachment of said pick off means to said balance bar.

Another aspect is that said second element that enables said attachment of said pickoffs includes a flat surface having an opening in said balance bar that facilitates the attachment of said pick off means to said balance bar.

Another aspect is that an element integral to said balance bar that lowers the resonant frequency of said balance bar towards that of said material filled flow tube and that said element that lowers said resonant frequency of said balance bar comprises elements of increased flexibility integral to said balance bar and that said element that increases the flexibility of portions of said balance bar comprises voids in said balance bar on each axial side of said center portion of said balance bar.

Another aspect is that said brace bar means defines separate brace bars each of which is integral with said balance bar at different ends of said balance bar;

each brace bar is a circular member having a center opening for receiving said flow tube and having a surface perpendicular to the longitudinal axis of said balance bar.

Another aspect is a method of fabricating a balance bar for a Coriolis flowmeter using a casting process that substantially decreases the amount of subsequent machining operations required on said balance bar prior to its assembly into said Coriolis flowmeter; said method of casting comprising the steps of:

forming a mold that includes;

a cavity that defines an elongated member of said balance bar having a radial center opening adapted to receive a flow tube, a cavity that defines brace bars integral to said balance bar and having a center opening at each end of said elongated member, a cavity that defines at least on void in said balance bar;

a cavity that defines at least one rib element integral to said balance bar to raise the lateral vibration frequency of said balance bar, said at least one rib element comprises ribs on the sides of said balance bar and oriented parallel to the longitudinal axis of said balance bar, and said ribs include elements that increase the cross sectional area of said balance bar in areas proximate said at least one voids that offset the tensile and compressive forces axially exerted on said balance bar whenever said flow tube attempts to change in length, said method of forming including the further steps of:

filling said cavities with molten material to form said balance bar; and extracting said formed balance bar from said mold.

Another aspect is that said mold formed by said step of forming further includes;

a cavity that defines a first mounting element integral to said balance bar to enable the attachment of a driver to said balance bar, said first mounting element defines an axially center element on said balance bar and a flat surface on said center element having a center opening that enables said attachment of said driver to said balance bar.

Another aspect is that said formed mold further includes;

a cavity that defines a second mounting element integral to said balance bar that enables the attachment of said pick off means to said balance bar, said second element includes a flat surface having an opening in said balance bar to facilitate the attachment of said pick off means to said balance bar.

Another aspect is that said formed mold further includes;

a cavity that defines an element integral to said balance bar to lower the resonant frequency of said balance bar towards that of said material filled flow tube;

said element that lowers said resonant frequency of said balance bar comprise elements of increased flexibility integral to said balance bar;

said element that increases the flexibility of portions of said balance bar comprises cutout portions defining voids in said balance bar on each axial side of said center portion of said balance bar.

Another aspect is that said formed mold further includes;

a cavity that defines an element integral to said balance bar that causes the vibration amplitude of said balance bar to be less than the vibration amplitude of said flow tube.

Another aspect is that said element that lowers the second bending frequency of said balance bar also makes the calibration factor of said Coriolis flowmeter independent of density of said flowing material.

DESCRIPTION OF THE DRAWINGS

These and other advantages of the invention may better understood from a reading of the following detail description thereof in which:

FIG. 2 illustrates further details of the balance bar;

FIG. 3 illustrates the balance bar of FIG. 2 in combination with a flow tube extending through the balance bar and further in combination with case connect links affixed to each end of the balance bar of FIG. 2.

DETAILED DESCRIPTION

Description of FIG. 1

Figure 1:
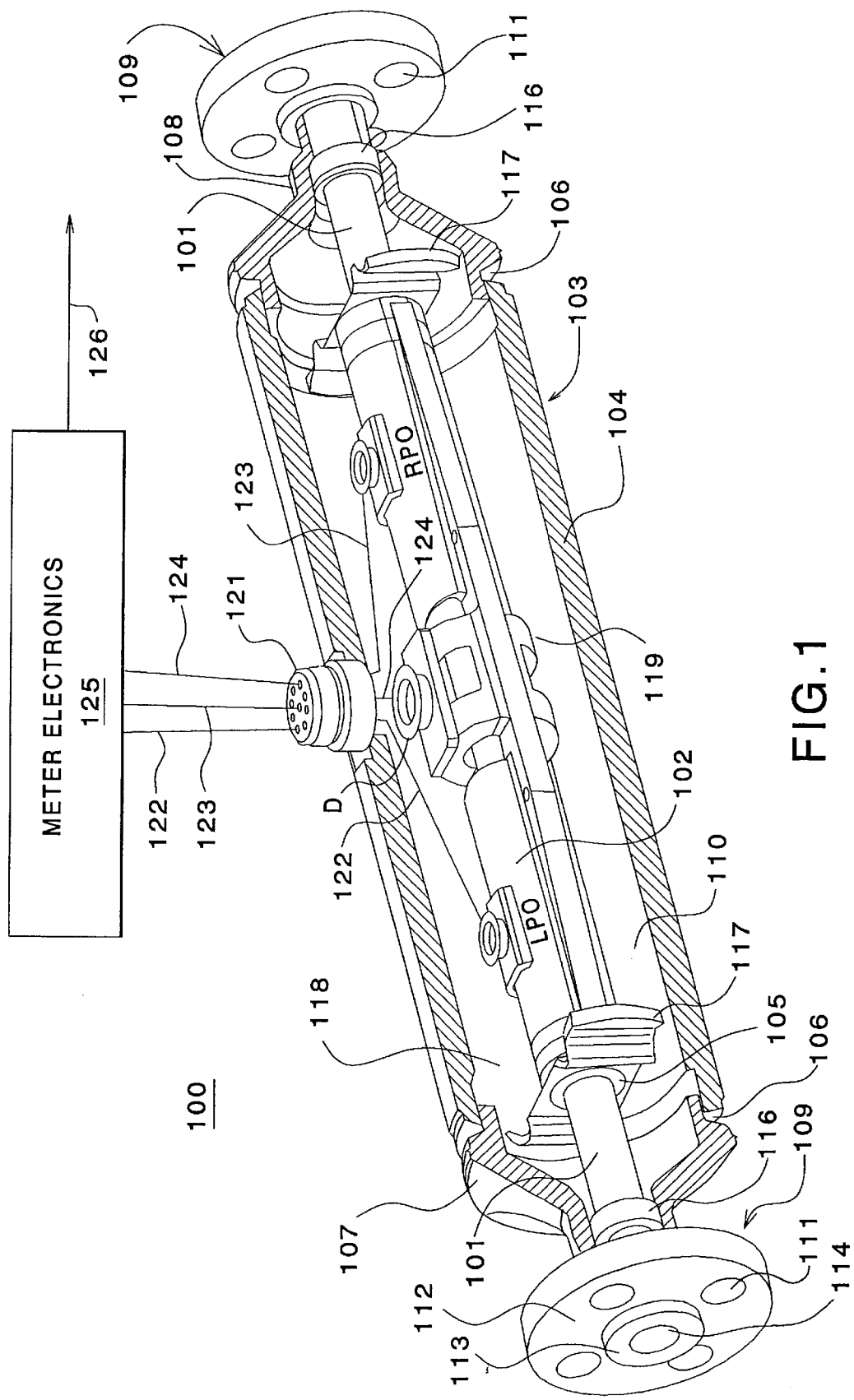
FIG. 1 illustrates an assembled straight tube Coriolis flowmeter having a balance bar embodying the present invention.

FIG. 1 shows balance bar 102 of the present invention embodied in a straight tube Coriolis flowmeter 100. The flowmeter of FIG. 1 includes balance bar 102, flow tube 101 positioned within the balance bar 102, and case 103 enclosing the flow tube and the balance bar. The flow tube extends for the entire length of the flowmeter 100 from input end 114 in flange 109, through cone connect element 116, through case connect link 117 and balance bar 102, through cone connect element 116 on the right side of the flowmeter to flange 109 on the output end of the flowmeter. Flange 109 includes a plurality of holes 111 to facilitate to the flange of a supply system to which flowmeter 100 may be connected. Flange 109 also has a circular washer 113 which protrudes from flange surface 112 and which is integral with flange 109. The left terminus of flow tube 101 extends through flange 109 and washer 113 and is flushed with the left surface of washer 113. Flow tube 101 is fixably coupled to cone connect element 116 to minimize flow tube vibrations. Flow tube 101 extends through brace bar 105 which is fixably coupled to flow tube 101 as well as case connect link 117 as well as the left end of balance bar 102.

Case 103 has a case wall 104 and is coupled at each end by a weld element 106 to a cone shaped case end 107 having a neck 108 which extends to the axial inner surface of each of flanges 109. Case connect link 117 is coupled at its ends to the inner surface 110 of wall portion 104 of case 103. Case connect links 117 minimize the vibration of the flow tube and balance bar ends.

Balance bar 102 has a driver D connected to its center portion 119 and a pair of pick offs LP0 and RP0. In the well known manner, driver D vibrates balance bar 102 and flow tube 101 in phase opposition. The flow of material through vibrating flow tube 101 generates Coriolis deflections in the flow tube. These Coriolis deflections are detected in the conventional manner by left pick off LP0 and right pick off RP0. The output signals generated by the pick offs are extended over conductors 122 and 123, through feed through 121 to meter electronics 125. Meter electronics 125 also applies a signal over conductor 124 to driver D to cause it to vibrate the flow tube and balance bar at the resonant frequency of the material filled flow tube. Meter electronics 125 receives the pick off signals over conductors 122 and 123, processes them and applies output data over path 126 to a utilization circuit (not shown). The output information on path 126 comprise information pertaining to the material flow.

Description of FIGS. 2 and 3

FIGS. 2 and 3 disclose further details of the balance bar of the present invention. FIG. 2 illustrates further details of balance bar 102 of FIG. 1. FIG. 3 discloses further details of the balance bar 102 in a partially assembled state of the flowmeter in which balance bar 102 is coupled to flow tube 101 and case connect links 117 and brace bar 105.

On FIG. 2, balance bar 102 comprises a cylindrical portion having an outlet end 204, a right body portion 201 and a left body-portion 202. Body portions 201 and 202 by themselves are cylinder shaped as shown by outlet end 204. Ribs 203 are integral with each side of the balance bar including the left and right body portions 202 and 201. Balance bar 102 further includes a center element 119 having a hole 221 for receiving driver D. Balance bar 102 further includes void 218 on the left side of center element 119 and void 219 on the right side of center element 119. The balance bar further includes element 207 having a flat surface 209 on its left end as well as a similar element 208 having a flat surface 211 on its right end portion. Element 207 includes a opening 212 for facilitating the mounting of left pick off LP0. Element 208 includes an opening 213 for facilitating the mounting of pick off RP0 to the right side of the balance bar. Holes 214 and surfaces 209 and 211 facilitate the engagement of the mounting hardware of pick offs RP0 and LP0 with balance bar 102. Flat surfaces 216 and 217 facilitate the mounting or trim weights (not shown) to balance bar 102. These trim weights are used for fine tuning the flow meter balance to overcome any variability in the manufacturing process. Opening 221 in center element 119 facilitates the mounting of driver D to brace bar 102. Screw holes 223 facilitate the mounting of hardware of driver D to the brace bar.

Balance bar 102 represents an advance over the balance bars of the prior art straight tube Coriolis flowmeters which utilize cylindrical members as balance bars. The provision of side ribs 203 on brace bar 102 is advantageous since the side ribs inhibit undesired lateral vibrations of brace bar 102 while having little effect on the desired vertical vibrations and, in particular, the vertical vibrations of the drive mode. Side ribs 203 and their center portions 224 and 225 are also advantageous in that they provide additional cross section area to the balance bar structure in the area of the balance bar proximate voids 218 and 219. This additional cross section area of the ribs imparts strength to the balance bar so as to resist the tensile and compressive thermal stresses applied by the case and flow tube. Rib portions 224 and 225 compensate for the loss of rigidity imparted by voids 218 and 219. Prior art balance bars machined from tubing lack the ribs and if they were to have voids similar to voids 218 and 219, the thermal stresses in the vicinity of the voids could be unacceptably high.

Balance bar 102 is further advantageous because it is manufactured to include elements 207 and 208 which facilitate the mounting of pick offs RP0 and LP0 to balance bar 102. Flat surfaces 209 and 211 of elements 207 and 208 provide an ideal surface for the mounting of pick offs RP0 and LP0 to the balance bar. This is an advantage over prior art balance bars which are nothing more than a cylindrical member having screw holes for mounting the pick off coils and a large hole for receiving the pickoff magnet. Alternately the prior art balance bars could have a machined flat for each pickoff which thins the balance bar excessively in the region of the screw holes. The presence of elements of 207 and 208 together with their flat surfaces 209 and 211 represent improved mounting facilities for the pick off coils and their associated hardware.

The balance bar of the present invention is further advantageous because of its inclusion of center portion 119 having opening 221 and a corresponding flat surface for facilitating the mounting of driver D and its coil to balance bar 102. The flat surfaces of center element 119 provides an improved mounting arrangement for driver D and its associated hardware as compared to the curved or machined surfaces of the prior art brace bars.

The provision of voids 218 and 219 on each side of center element 119 increases the flexibility of balance bar 102 by lowering its stiffness. This lowers the resonant frequency of the balance bar to that of the material filled flow tube. The matching of resonant frequencies is necessary to achieve vibration free operation of the flowmeter. Removing stiffness from near the center of the balance bar concentrates the remaining stiffness in the region of the brace bar 105 which better enables the flowmeter to remain balanced over a wide range of fluid densities. This is a distinct advantage over prior art flowmeters in which their balance bars comprise a cylindrical member that must be calibrated and adjusted with the addition of weights to match the balance bar frequency to that of the flow tube with material. Furthermore, different weights must be provided to operate with different density fluids.

The provision of the voids 218 and 219 is also advantageous in that they lower the stiffness of the balance bar in the second bending mode. This lowers the second bending resonant frequency to a point where its deflection, in response to the Coriolis deflection of the flow tube, is able to cancel the change in flow sensitivity with fluid density. This is advantageous since makes the calibration factor of the flowmeter independent of density.

The balance bar of the present invention is further advantageous because of its inclusion of center portion 119 which has greater wall thickness than the rest of the balance bar and thus has greater mass. This mass lowers the balance bar drive mode vibration amplitude to be lower than that of the flow tube. This is advantageous in that it increases the flow sensitivity of the meter as discussed earlier. The concentration of the mass toward the center of the balance bar where the drive mode vibration amplitude is the greatest constitutes an optimum use of the balance bar material. The same mass located near the ends of the balance bar where the vibration amplitude is small would have very little effect on the meter balance or amplitude ratio. The balance bars of prior art meters consist of tubing of uniform wall thickness. This makes it difficult to locate added mass elements to the balance bar.

The balance bar of the present invention is further advantageous since it is fabricated to include brace bar 105 integral with the balance bar 102. This is a distinct advantage over the balance bars of the prior art flowmeters in which the balance bars and brace bars were separate elements and which had to be made, assembled, and affixed to one another during the assembly of the flowmeter. Reducing the braze joints or welds between the balance bar and the flow tube from four to two lowers the manufacturing cost and increases the reliability of the meter.

In summary, balance bar 102 is advantageous since it is fabricated to have specified and known operational characteristics that match the needs of the flowmeter into which it is incorporated. Its manufacture by casting allows design flexibility to tune the frequencies of the desired modes to have their optimum values. It also allows for features to alter the frequencies of problem modes so as to separate their frequencies from the operational frequencies and thereby eliminate their negative impact on meter performance. Furthermore, its manufacture by casting allows for features, such as pads for mounting coils and integral brace bars, which lower manufacturing cost. The use of the balance bar having these known and desired characteristics is far superior compared to those of the prior art which use a cylindrical member for the balance bar.

It is to be expressly understood that the claimed invention is not to be limited to the description of the preferred embodiment but encompasses other modifications and alterations within the scope and spirit of the inventive concept. For example, although the present invention has been disclosed as comprising a part of a single straight tube Coriolis flowmeter, it is to be understood that the present invention is not so limited and may be used with other types of Coriolis flowmeters including single tube flowmeters of irregular or curved configuration as well as Coriolis flowmeters having a plurality of flow tubes.

Also, the balance bar of the present invention has been described as being ideally fabricated as an integral structure by a casting process. The disclosed balance bar, however, may be fabricated by any method of manufacture that produces a balance bar having the structure of the balance bar defined by the apparatus claim of this application. Other such methods of manufacture includes a casting process that produces separate parts which are then formed together to form the integral balance bar disclosed and claimed herein. Thus, the side ribs could be separately formed and then affixed to a cylindrical member to form the subject balance bar. The disclosed balance bar may also be formed as an integral structure by a machining process, or by a machining process which produces a plurality of separate components which are joined together to produce the subject balance bar.

What is claimed is:

1. A method of fabricating a balance bar for a Coriolis flowmeter comprising the steps of:

forming said balance bar as an elongated member having a radial center opening adapted to receive a flow tube, forming brace bars integral to said balance bar and having a center opening at each end of said elongated member, forming at least on void in said balance bar;

forming at least one rib element integral to said balance bar to raise the lateral vibration frequency of said balance bar, said at least one rib element comprises ribs on the sides of said balance bar and oriented parallel to the longitudinal axis of said balance bar, and said ribs include elements that increase the cross sectional area of said balance bar in areas proximate said at least one voids that offset the tensile and compressive forces axially exerted on said balance bar whenever said flow tube attempts to change in length.

2. The method of claim 1 further including the steps of:

forming a first mounting element integral to said balance bar to enable the attachment of a driver to said balance bar, said first mounting element defines an axially center element on said balance bar and forming a flat surface on said center element having a center opening that enables said attachment of said driver to said balance bar.

3. The method of claim 2 further including the steps of:

forming a second mounting element integral to said balance bar that enables the attachment of said pick off means to said balance bar, said second element includes a flat surface having an opening in said balance bar to facilitate the attachment of said pick off means to said balance bar.

4. The method of claim 3 further including the steps of:

forming an element integral to said balance bar to lower the resonant frequency of said balance bar towards that of said material filled flow tube;

said element that lowers said resonant frequency of said balance bar comprise elements of increased flexibility integral to said balance bar;

said element that increases the flexibility of portions of said balance bar comprises cutout portions defining voids in said balance bar on each axial side of said center portion of said balance bar;

said element that lowers the second bending frequency of said balance bar also makes the calibration factor of said Coriolis flowmeter independent of density of said flowing material.

5. The method of claim 4 further including the steps of:

forming an element integral to said balance bar that causes the vibration amplitude of said balance bar to be less than the vibration amplitude of said flow tube.

6. The method of claim 1 characterized in that said steps of forming include forming a mold having:

a cavity that defines an elongated member of said balance bar having a radial center opening adapted to receive a flow tube, a cavity that defines brace bars integral to said balance bar and having a center opening at each end of said elongated member, a cavity that defines at least on void in said balance bar;

a cavity that defines at least one rib element integral to said balance bar to raise the lateral vibration frequency of said balance bar, said at least one rib element comprises ribs on the sides of said balance bar and oriented parallel to the longitudinal axis of said balance bar, and said ribs include elements that increase the cross sectional area of said balance bar in areas proximate said at least one voids that offset the tensile and compressive forces axially exerted on said balance bar whenever said flow tube attempts to change in length, said method of forming including the further steps of:

filling said cavities with molten material to form said balance bar; and extracting said formed balance bar from said mold.

7. The method of claim 2 characterized in that said steps of forming include the step of forming a mold having:

a cavity that defines a first mounting element integral to said balance bar to enable the attachment of a driver to said balance bar, said first mounting element defines an axially center element on said balance bar and a flat surface on said center element having a center opening that enables said attachment of said driver to said balance bar.

8. The method of claim 3 characterized in that said steps of forming include the step of forming a formed having:

a cavity that defines a second mounting element integral to said balance bar that enables the attachment of said pick off means to said balance bar, said second element includes a flat surface having an opening in said balance bar to facilitate the attachment of said pick off means to said balance bar.

9. The method of claim 4 characterized in that said steps of forming include the step of forming a mold having:

a cavity that defines an element integral to said balance bar to lower the resonant frequency of said balance bar towards that of said material filled flow tube;

said element that lowers said resonant frequency of said balance bar comprise elements of increased flexibility integral to said balance bar;

said element that increases the flexibility of portions of said balance bar comprises cutout portions defining voids in said balance bar on each axial side of said center portion of said balance bar;

said element that lowers the second bending frequency of said balance bar also makes the calibration factor of said Coriolis flowmeter independent of density of said flowing material.

10. The method of claim 5 characterized in that said steps of forming include the step of forming a mold having:

a cavity that defines an element integral to said balance bar that causes the vibration amplitude of said balance bar to be less than the vibration amplitude of said flow tube.

11. The method of claim 5 including the step of filling said cavities with material to constitute said balance bar.

* * * * *